United States Patent [19]
Oborn

[11] 3,982,040
[45] Sept. 21, 1976

[54] EGG WHITE COMPOSITION
[75] Inventor: Robert Edward Oborn, Cincinnati, Ohio
[73] Assignee: The Procter & Gamble Company, Cincinnati, Ohio
[22] Filed: Oct. 16, 1975
[21] Appl. No.: 623,135

[52] U.S. Cl. .............................................. 426/614
[51] Int. Cl.² ........................................ A23L 1/32
[58] Field of Search ........... 426/552, 554, 555, 558, 426/614

[56] References Cited
UNITED STATES PATENTS

| | | | |
|---|---|---|---|
| 2,881,077 | 4/1959 | Kline et al. ......................... | 426/555 |
| 2,919,992 | 1/1960 | Gorman et al. .................. | 426/614 X |
| 3,149,979 | 9/1964 | Bohn et al. ...................... | 426/555 X |

*Primary Examiner*—A. Louis Monacell
*Assistant Examiner*—R. A. Yoncoskie
*Attorney, Agent, or Firm*—Leonard Williamson; Louis G. Xiarhos; Richard C. Witte

[57] ABSTRACT

Desugared egg white and bisulfite provides an improved egg white composition having improved egg white functionality, particularly in culinary mixes of the foam batter type, e.g., angel food cake mixes.

8 Claims, No Drawings

EGG WHITE COMPOSITION

BACKGROUND OF THE INVENTION

This invention relates generally to an improved egg white. In another respect it relates to a process which improves the functionality of desugared egg white.

The substance with which this invention is concerned is albumen, the material which is present in greater quantity than either the yolk or shell of the avian egg. As used herein, "albumen" refers to what is popularly known as the "egg white", and is distinguished from "albumin", which is used to refer to a broader class of proteinaceous materials. Egg white is comprised chiefly of protein substances, and the substances generally said to be present are ovalbumin, constituting about 75% of the total solids in the egg white, ovomucoid, ovomucin, ovoconalbumin, and ovaglobulin. The functional characteristics of egg white are determined to a very great extent by the proteinaceous materials in the egg white, and especially by the ovalbumen present. Much of this functionality of egg white is lost in the processing thereof, particularly in drying processes.

The present invention is concerned with desugared egg white. The term "desugared egg white", as used herein, refers to egg white having a glucose content not in excess of about 1%. Preferably, the glucose content will be 0.3% or less. Either of two methods, enzymatic or microbial, can be utilized to prepare desugared egg white. Both methods are well known in the art and are equivalent as far as the present invention is concerned.

The largest use of eggs is in the culinary art. Ingredients such as flour, sugar, fat, and leavening are added to prepare meringues, cakes, custards, and so on. Another extensive use for eggs is in the preparation of other edible materials. Another use for eggs is in the preparation of adhesives.

In many instances, it is desirable to separate the albumen of the egg from the yolk so that advantage may be taken of the peculiar properties of each of these two constituents. An example of the use of the egg white component is in the preparation of angel food cake. In the preparation of angel food cake, the egg white from a large number of eggs is vigorously beaten in the absence of lipid substances to obtain a stable foam, and then the other ingredients are added. Egg white also is very important in the preparation of the so-called "white cake" which relies upon egg white and requires no egg yolk such as is used in, for example, "yellow cake".

Some cake mixes of the foam batter type comprise at least two packages, one of which contains a whippable material such as dried whole egg or egg white, sugar, and additives such as cream of tartar and sodium hexametaphosphate. A second package may contain flour and/or starch, additional sugar, dried egg yolk, a vegetable oil and additives such as cream of tartar and flavoring. To prepare a cake from such a mix, water is added to the ingredients of the first package containing the whippable material, said material is whipped to a stable foam and the ingredients of the second package are gently folded into the foam. The batter thus prepared is then ready for baking. Examples of such twin-packet formulation for angel food cakes are found in U.S. Pat. No. 3,078,168, Bedenk, Feb. 19, 1963.

Cake mixes of the foam batter type comprising an intimate mixture of all the ingredients contained in one package and requiring only the addition of water, beating and baking to prepare a cake have been developed.

The principal problem in using dried egg white in the culinary arts is in obtaining performance from the dried egg white approaching the performance of an equivalent amount of fresh eggs. The eggs, whether whole egg or egg white, are frequently denatured in the course of drying. Further damage can occur on storage and handling. Moreover, dried eggs are probably less effective than fresh eggs when used in combination with certain kinds of flour. For example, they may provide a good foam but when flour is added and the batter baked a loss in egg white functionality is observed.

It has been a common experience to find that certain unaged cake mixes provide extremely good quality, large volume cakes when prepared under carefully controlled conditions but are far less successful when aged. The tolerance to recipe variation of presently available mixes of the foam batter type containing prior art egg white tends to be quite limited.

Another important problem in angel food cakes is cupping (surface depressions) on the inverted side of baked angel food cakes. Thus, the underside of a cake removed from an angel food tin or pan may be observed to have a series of cup-like depressions over a portion of the surface of the cake. Reduced functionality of the egg white appears to adversely affect the surface of the cakes. It also affects color, texture and flavor.

An object of this invention is to enhance the functionality of dried desugared egg white. Other objects of this invention include the provisions of a composition of matter for use in preparing angel food-type cakes which results in cakes with reduced cupping, whiter color, increased volume, excellent texture, and increased recipe tolerance, particularly when dried eggs are employed in a dry cake mix. Other objects will be apparent from the discussion hereinafter of the invention.

SUMMARY OF THE INVENTION

An egg-white composition having improved functionality is comprised of desugared egg-white and an alkali metal bisulfite, preferably sodium bisulfite. The bisulfite is uniformly present in said composition at a level of from about 0.005% to about 1.0% by weight of the dry desugared egg white. A preferred range of bisulfite is from about 0.05% to about 0.50%, and a more preferred range is from about 0.14% to about 0.20%. Culinary products made with this improved egg white composition show improved results, for example, in angel food cakes: reduced cupping, whiter color, increased flavor, better texture, and increased recipe tolerance.

DETAILED DESCRIPTION OF THE INVENTION

In accordance with this invention, egg white is separated and desugared. The alkali metal bisulfite may be immediately added to the desugared egg white, which, in turn, may then be frozen or dried. If the whites are frozen, they may be kept for extended periods and then dried, the bisulfite still being effective to provide the enhanced egg white functionality.

It has been found that the level of alkali metal bisulfite should be from about 0.005% to about 1% by weight of the dry desugared egg white. Dry desugared egg white, as used herein, refers to a substantially dry egg white material inclusive of moisture content not greater than about 12% by weight. The amount of bisulfite in the dry egg white, in general, increases the desirable albuminous functional groups. A preferred amount of bisulfite is from about 0.05% to about 0.5% by weight of the dry egg white. The best results ae achieved with substantially dry egg white having from about 1400 ppm (or 0.14%) to about 2000 ppm (or 0.20%) bisulfite, said egg white having 9% or less moisture content.

Sodium bisulfite is preferred. Other bisulfites having monovalent cations, such as potassium and ammonium, can also be used.

The features of this invention may be enjoyed as stated above, by adding the bisulfite at any point to the egg white, as for example, before freezing, after thawing, just before drying, or after drying. For example, the bisulfite can be simply admixed uniformly with a dried egg white material. Alternatively, the bisulfite can be added to liquid egg white and the mixture dried as desired. Any of a variety of drying methods can be utilized to prepare dry bisulfite-containing egg white from liquid egg white. Typically, the alkali metal bisulfite will be mixed with liquid egg white to provide a uniform or homogeneous mixture and then dried to substantial dryness. Conventional spray-drying and freeze-drying methods can be employed to advantage. Preferably, the egg white will be dried to a moisture content of about 9% or less.

The advantages afforded by the present invention are illustrated by improvements shown in egg white performance in bisulfite-containing angel food cake mixes. It is, however, understood that the present improved egg white affords advantages in other processes and product formulations in which egg whites are utilized, for example, in the adhesive, confectionery and other culinary arts. The advantages of the present invention, e.g., reduced cupping and improved egg white functionality, are not to be confused with the desirable benefits obtained by the employment of known bisulfites as stabilizers or preservatives in foodstuffs.

The following Examples and Tables illustrate the improvement obtained by adding bisulfite to desugared egg white. The specifications for the desugared egg white used in the Examples were: 0.2% maximum glucose; 6.5–7.5 pH; 8.0% maximum $H_2O$; 97% minimum through U.S. 100 mesh particle size; TPC-25,000 maximum bacteria; negative Salmonella. In each Example, percentage of bisulfite is expressed as percentage by weight of the dry egg white material inclusive of its moisture content.

EXAMPLE I

Three samples of bisulfite-containing egg white, identified in Table I as Samples A through C, were prepared by homogeneously mixing U.S.P. sodium bisulfite with 10.16 kg. of liquid microbially desugared egg white and drying the resulting mixture by spray drying to a moisture content of less than 8% by weight. Each sample was dried in the same manner but differed in the amount of bisulfite incorporated into the egg white. Stated percentages are expressed as percentages by weight of the dry egg white inclusive of the moisture content of the egg white. The percentages are approximate and were calculated on the basis of the amount of bisulfite added to the liquid egg white and the approximate amount of dry egg white material recovered from the drying process. In actuality, percentage of bisulfite may be somewhat less than stated due to loss of bisulfite during drying.

Another two samples of bisulfite-containing egg white, identified in Table I as Samples D and E, were prepared by homogeneously mixing bisulfite with 10,000 pounds of liquid microbially desugared egg white which contained about 11.5% solids. The mixing was conducted in a vat and the mixture was spray-dried in a box-type spray dryer to a substantially dry and flowable material. Stated percentages are theoretical. In actuality, the percentages may be somewhat less than stated due to loss of some bisulfite in the drying process.

A dried egg-white control, identified in Table I as Control, was also prepared and contained no added bisulfite. Samples A through E and the Control were analyzed for sulfhydryl content which may be an indication of egg white functionality. A UV spectroscopy method was used based on the reaction of p-chloromercuribenzoate with three sulfhydryl groups present in ovalbumen (Boyer, P. D., *J. Am. Chem. Soc.* 76, 4331, 1954). Results are shown below in micromoles of SH per gram of egg white solids and assumes a molecular weight of 46,000. The ovalbumen standard used in the Table below was obtained from the Sigma Chemical Co., No. A-2512, Egg Ovalbumen, crystallized and lyophilized, salt-free, grade VI, electrophoretic purity about 99% and nitrogen content about 15%.

TABLE I

DRIED EGG WHITE COMPOSITIONS

| Sample | Amount (in grams) of $NaHSO_3$ added to Liquid Egg White | Yield (in grams) of dried egg white composition | Percent Sodium Bisulfite in Dried Egg White Composition | Absorbance (250 mm) | Sulfhydryl Content moles/grams |
|---|---|---|---|---|---|
| A | 0.1 | 1000 ± 100 | 0.01 | 0.313 | 50 |
| B | 0.5 | 1000 ± 100 | 0.05 | 0.325 | 51 |
| C | 1.32 | 933 | 0.14 | 0.340 | 53 |
| D | 1044 | | 0.20 | 0.389 | 62 |
| E | 5220 | | 1.0 | 0.422 | 67 |
| Control | — | | — | 0.335 | 53 |
| Ovalbumen Standard | — | | — | 0.239 | 37 |

EXAMPLE II

Dried egg white compositions of Example I (Samples A, B and C) were used in the preparation of angel food cakes. Twin-packet dry angel food cake mixes comprising an "A" package having the egg white composition of Example I, sugar, salt and whipping aid and a "B" package having sugar, flour, starch, leavening agents, hydrogenated vegetable oil hardstock and flavoring were prepared. In each cake formulation, the egg white sample of the A packet was used at the same amount (21.03% by weight of the A mix). In each case, the contents of the A mix were added to water and whipped to a foam. The contents of the B packet were folded into the foam and the resulting batter was baked to an angel food cake. The results for cakes utilizing the sample egg white compositions of Example I and the Control egg white material are set forth in Table II.

TABLE II

| Batch | Bake Height mm | % Cupping On Inverted Cake Surface | Comments |
|---|---|---|---|
| Control | 12.5 | 20 | Many cups |
| A | 11.6 | 12 | Reduced Cups |
| B | 12.6 | 8 | Significantly reduced cups Slightly whiter grain |
| C | 12.8 | 0 | Cups eliminated- whiter grain |

As can be seen from the results set forth in Table II, cakes containing bisulfite-treated egg white materials A, B and C were substantially improved in cupping properties relative to cakes prepared from the control egg white material which contained no bisulfite.

EXAMPLE III

Dried egg white compositions of Example I (D and E) were utilized in the preparation of angel food cake mixes and cakes in the manner of Example II except that the hydrogenated vegetable oil hardstock of the B package was employed in a slightly greater amount. The results of cakes prepared are set forth in Table III.

TABLE III

| Batch | Bake Height mm. | % Cupping On Inverted Cake Surface | Comments |
|---|---|---|---|
| Control | 12.5 | 6 | Control |
| D | 11.6 | 0 | No cups - whiter grain |
| E | 11.3 | 0 | No cups - whiter grain - slight sulfur odor |

As can be seen from the results set forth in Table III, the cakes containing bisulfite-treated egg white materials D and E were improved in cupping properties relative to cakes prepared from the control egg white material which contained no bisulfite.

EXAMPLE IV 0.1 gm. of sodium bisulfite was uniformly mixed into an A mix of a twin-packet angel food cake formulation comprising enzymatically desugared dry egg white, sugar, cream of tartar, salt and flavoring. The B-packet, as used herein, contained sugar, flour, wheat starch, and hardstock. These mixes were put in a control room along with regular mix to study shelf life. Angel food cake batters were made therewith. The bake results are set out in Table IV and V.

The mixes in Table IV were stored for 3 weeks at 50°F before using.

TABLE IV

| Batch | Height mm | % Cupping | Comments |
|---|---|---|---|
| I | 12.6 | 18 | No bisulfite added |
| II | 13.1 | 0 | Whiter grain 0.1 gm. bisulfite added |

The cake mixes of Table V were aged for 12 weeks at 100°F and 70% relative humidity, which conditions are equivalent to 12 months storage on the market.

TABLE V

| Batch | Height mm | % Cupping | Comments |
|---|---|---|---|
| I | 12.4 | 35 | More cupping than unaged package |
| II | 12.1 | 2 | Very little cupping Better shelf-life Whiter grain |

It should be noted that there was about twice as much cupping in the above regular, batch I, angel food cake than there was in the unaged I of Table IV.

EXAMPLE V 0.1 gm. of U.S.P. sodium bisulfite was added to an angel food cake twin-packet mix by dissolving it in the water, 329 ml, prior to adding the A-packet, 210 gms. This A-packet contained about 21% of enzymatic desugared dried egg white which is about 44 gms. Thus, the amount of bisulfite added constituted about 0.23% by weight of the egg white. The A-packet was added to water containing the bisulfite and whipped. The B-packet, 216 gms. which contained sugar and farinaceous material, was folded into the whip and the batter was put in a pan and baked in an oven at 375°F using low top heat for about 35 minutes.

A regular mix, the same as above except that no bisulfite was added, was made and baked in the same oven at the same time. The regular bake had a cake height of about 12.4 mm and 10% cupping on the inverted surface of the cake. The bake with 0.1 gm. bisulfite added had a cake height of about 12.6 mm and 0% cupping. The results are set forth in Table VI.

Similar results are obtained when the sodium bisulfite of Example V is replaced on an equimolar basis with potassium bisulfite.

EXAMPLE VI – VIII

In order to show the effects of bisulfite on the functionality of dried egg white in angel food cake mixes, A-packet mixes were prepared having the following levels of dried egg white 15, 16 and 17 percent by weight of the A-packet. Bakes were made following the process of Example V. In each case 0.1 gms. of bisulfite was added to the water before the A-packet. The results are tabulated in Table VI. The first bake tabulated was made from a regular twin-packet mix having an A-packet containing about 21% dried egg white as set out in Example V.

TABLE VI

| % Egg White In "A" Packet | Total Mix | Height mm | % Cupping | Comments |
|---|---|---|---|---|
| 21 | 10.5 | 12.4 | 10 | No NaHSO$_3$ added |
| 21 | 10.5 | 12.6 | 0 | 0.1 gm. NaHSO$_3$ added; 0.23% of egg white |

TABLE VI-continued

| % Egg White In "A" Packet | Total Mix | Height mm | % Cupping | Comments |
|---|---|---|---|---|
| 15 | 7.5 | 12.5 | 0 | 0.1 gm. NAHSO₃ added; 0.32% of egg white |
| 17 | 8.5 | 12.6 | 0 | 0.1 gm. NaHSO₃ added; 0.28% of egg white |
| 16 | 8.0 | 12.1 | 0 | 0.1 gm. NaHSO₃ added; 0.30% of egg white |

NOTE: The total weight of the A packet in each of the above was 210 gms.

It is clear from the above data that a marked improvement is obtained by addition of bisulfite to the dried egg white. The cake made with 15% egg white represents more than 28% reduction in the level of egg white used in the standard formulation. Yet, the cake height of the 15% A-packet was comparable to the 21% standard commercial formulation without added bisulfite. Thus, it is apparent that even though a larger percentage of the egg white without additive was used in the control angel food cake mix, the mixes containing 15% and 16% egg white to which bisulfite was added gave higher cakes without cupping.

EXAMPLE VII 0.1 gram of NaHSO₃ was dissolved in water and the contents of a single packet commercially available angel food cake mix were added thereto following the instructions on the package. The baking results were compared to bakes without the addition of bisulfite and the results are set out in Table VII, as X and X', the X' containing the added NaHSO₃.

EXAMPLE VIII

The same as Example VII except that a different commercial angel food cake mix was used. The results are set out in Table VII and Y and Y', the Y' containing the added NaHSO₃.

TABLE VII

| Commercial Mixes | Grams of NaHSO₃ | Bake Height Inches | % Cups |
|---|---|---|---|
| X | — | 4.60 | 5 |
| X' | 0.1 | 4.40 | 0 |
| Y | — | 4.90 | 15 |
| Y' | 0.1 | 4.90 | 0 |

These one-packet commercial mixes are estimated as containing from about 6% to about 12% dried, desugared egg white solids by weight of the total mix. The X angel food cake one-step mix lists on the package the following ingredients: sugar, flour (bleached), dried egg whites, modified wheat and corn starches, leavening, artificial flavor, calcium chloride, citric acid, enzyme modified soy protein, sodium lauryl sulfate.

The Y white angel food cake one-step mix lists the following ingredients on the package: sugar, enriched bleached flour, dried egg whites with sodium lauryl sulfate, wheat starch, leavening, cellulose gum and artificial flavoring.

The package directions for these commercial angel food cake mixes were followed; except, of course, 0.1 gm. of NaHSO₃ was added to X' and Y'.

In conclusion, the present improved egg white has a major use in the formulation of angel cake mixes. A less amount of expensive egg white is required in the formulation, plus, the cupping problem is eliminated or reduced.

What is claimed is:

1. An egg white composition comprising desugared egg white and from about 0.005% to about 1.0% by weight of the composition of an alkali metal bisulfite, said egg white composition being substantially dry.

2. The egg white composition of claim 1 wherein said bisulfite comprises from about 0.05% to about 0.5% of said egg white composition.

3. The egg white composition of claim 1 wherein said bisulfite is sodium bisulfite.

4. The egg white composition of claim 1 wherein said bisulfite is potassium bisulfite.

5. In the process of making a substantially dry egg white composition comprising desugared egg white, the improvement comprising adding from about 0.005% to about 1.0% of an alkali metal bisulfite by weight of the dry egg white composition.

6. The process of claim 5 wherein said bisulfite is added to said egg white prior to drying.

7. The process of claim 5 wherein said bisulfite is added to said desugared egg white after said egg white is dried.

8. The process of claim 5 wherein said bisulfite comprises from about 0.05% to about 0.5%.

* * * * *